(12) United States Patent
Mouri

(10) Patent No.: US 10,782,216 B2
(45) Date of Patent: Sep. 22, 2020

(54) MATERIAL TESTING MACHINE

(71) Applicant: SHIMADZU CORPORATION, Kyoto (JP)

(72) Inventor: Mitsuhiro Mouri, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/242,006

(22) Filed: Jan. 8, 2019

(65) Prior Publication Data

US 2019/0265137 A1 Aug. 29, 2019

(30) Foreign Application Priority Data

Feb. 27, 2018 (JP) .................................. 2018-033306

(51) Int. Cl.
*G01N 3/08* (2006.01)
*G06F 3/048* (2013.01)
*G06F 17/11* (2006.01)
*G05B 23/02* (2006.01)

(52) U.S. Cl.
CPC ............. *G01N 3/08* (2013.01); *G05B 23/0216* (2013.01); *G06F 3/048* (2013.01); *G06F 17/11* (2013.01); *G01N 2203/0016* (2013.01); *G01N 2203/0075* (2013.01); *G01N 2203/0218* (2013.01); *G06F 2206/1008* (2013.01)

(58) Field of Classification Search
None
See application file for complete search history.

(56) References Cited

U.S. PATENT DOCUMENTS

| 5,603,021 | A | * | 2/1997 | Spencer | .................. G06F 40/18 |
| 5,724,257 | A | | 3/1998 | Gerosa et al. | |
| 10,180,440 | B1 | * | 1/2019 | Helfman | ............ G01R 31/2834 |
| 2014/0142759 | A1 | | 5/2014 | Schulz | |
| 2017/0300035 | A1 | * | 10/2017 | Kawai | ................ G05B 19/4068 |

FOREIGN PATENT DOCUMENTS

| JP | H09043124 | 2/1997 |
| JP | 2005214634 | 8/2005 |

OTHER PUBLICATIONS

"Search Report of Europe Counterpart Application", dated Jul. 25, 2019, pp. 1-9.
John Denton, "Getting the most out of your scientific calculator", scientific calculator, Nov. 14, 2008, pp. 1-53.

* cited by examiner

*Primary Examiner* — Justin S Lee
(74) *Attorney, Agent, or Firm* — JCIPRNET

(57) ABSTRACT

A material testing machine is provided. A screen for numerical value input is provided with numerical value input keys that are composed of a decimal point key, number keys of 0-9 and a symbol changing key for changing symbols of plus or minus of input numerical values, operation keys assigned to four arithmetic operations, an equal key for obtaining a calculation result, an input column in which values that are input using numerical value input keys and so on are displayed, a clear key for deleting the numerical values or operations input previously and emptying the input column, a backspace key for deleting the numerical values in the input column character by character, and parameter buttons assigned to parameters stored in a storage part.

5 Claims, 7 Drawing Sheets

| | cross-sectional secondary moment | cross section modulus | bending moment $M$ | stress $\sigma = M/Z$ | strain $\varepsilon$ |
|---|---|---|---|---|---|
| | $I$ | $Z$ | $\dfrac{L}{4} \cdot F$ | $\dfrac{L}{4Z} \cdot F$ | $\dfrac{12}{L^2 \dfrac{Z}{I}} \cdot \Delta l$ |
| flat plate | $\dfrac{WT^3}{12}$ | $\dfrac{WT^2}{6}$ | $\dfrac{LF}{4}$ | $\dfrac{3}{2} \cdot \dfrac{LF}{WT^2}$ | $\dfrac{6T}{L^2} \cdot \Delta l$ |
| round bar | $\dfrac{\pi D^4}{64}$ | $\dfrac{\pi D^3}{32}$ | $\dfrac{LF}{4}$ | $\dfrac{8LF}{\pi D^3}$ | $\dfrac{6D}{L^2} \cdot \Delta l$ |

|  | cross-sectional secondary moment | cross section modulus | bending moment $M$ | stress $\sigma = M/Z$ | strain $\varepsilon$ |
|---|---|---|---|---|---|
|  | $I$ | $Z$ | $\dfrac{L}{4} \cdot F$ | $\dfrac{L}{4Z} \cdot F$ | $\dfrac{12}{L^2 \dfrac{Z}{I}} \cdot \Delta l$ |
| flat plate | $\dfrac{WT^3}{12}$ | $\dfrac{WT^2}{6}$ | $\dfrac{LF}{4}$ | $\dfrac{3}{2} \cdot \dfrac{LF}{WT^2}$ | $\dfrac{6T}{L^2} \cdot \Delta l$ |
| round bar | $\dfrac{\pi D^4}{64}$ | $\dfrac{\pi D^3}{32}$ | $\dfrac{LF}{4}$ | $\dfrac{8LF}{\pi D^3}$ | $\dfrac{6D}{L^2} \cdot \Delta l$ |

FIG. 3

MATERIAL TESTING MACHINE

CROSS-REFERENCE TO RELATED APPLICATION

This application claims the priority benefit of Japan Patent Application No. 2018-033306, filed on Feb. 27, 2018. The entirety of the above-mentioned patent application is hereby incorporated by reference herein and made a part of this specification.

BACKGROUND

Technical Field

The disclosure relates to a material testing machine that applies a test force to a test piece to perform a material test.

Related Art

In the material testing machine that applies the test force to the test piece to perform the material test, the material test that corresponds to a shape or a material quality of the test piece is conducted. For example, in a tensile test in which a tensile test force is applied to a test piece, it is important to know a relationship between a stress and a strain of a material in order to know mechanical properties of the material. Furthermore, the stress is calculated from a cross-sectional area obtained from the shape of the test piece and the tensile test force applied to the test piece, and the strain is calculated from a distance between gauge points of the test piece and a displacement generated in the test piece. Therefore, in the material testing machine, as a test preparation, information such as a test piece size and the distance between gauge points and so on is set, and calculation formulas for working out general material characteristic values, such as the stress or the strain and so on, from a measurement data are stored in a storage part corresponding to test piece information.

In Japanese Laid-Open No. H9-43124, a material testing machine is proposed which can define not only calculation formulas defined by a standard, but also any calculation formula.

In a material test, particular parameters of a material test are used to calculate a maximum test force and a maximum displacement amount of a conducted test, and those values are input to a control device in advance. For example, on an occasion of a tensile test, the maximum test force can be calculated by multiplying a cross-sectional area of a test piece by a target stress. Furthermore, the cross-sectional area is a parameter which affects the stress in the tensile test, and can be calculated from a shape of the test piece.

Conventionally, a user inputs a size of the test piece to a control device in advance, by which the cross-sectional area of the test piece required by a stress calculation in the test and so on is automatically calculated, and stored in a control device to display the stress or a stress-strain curve in a display device in real time. Except the application in the real-time calculation in the test, the values of the parameters such as the cross-sectional area and so on cannot be used by the user in other calculations via a graphical user interface (GUI) that uses the display device. Therefore, the user uses electronic calculators separately to calculate a maximum test force, when the user inputs the maximum test force before a test is conducted and so on.

SUMMARY

The invention recited in technical solution 1 is a material testing machine, which includes a graphical user interface including a display device and an input device, and which includes a control device that has: a display control part configured to control a screen display to the display device; a storage part configured to associate calculation formulas for working out material characteristic values from measurement data with test information and store the calculation formulas; and an operation part configured to work out the material characteristic values using the calculation formulas read out from the storage part; wherein the display control part displays a first input interface, in which numerical value display columns are provided, in the display device, and displays a second input interface in the display device when an instruction for inputting numerical values to the numerical value display columns is received from the first input interface, wherein the second input interface is provided with an input column, number keys which accept input operations of the numerical values input into the input column, operation keys which correspond to four arithmetic operations, parameter buttons which are associated with parameters included in the calculation formulas selected from the test information, and a confirmation button which reflects the numerical values of the input column in the numerical value display column in the first input interface; the operation part operates, based on the test information, the parameters included in the calculation formulas selected from the test information; and the storage part associates the parameters included in the calculation formulas selected from the test information with the parameter buttons, and stores the parameters.

BRIEF DESCRIPTION OF THE DRAWINGS

FIG. 3 is a table in which test piece shapes and calculation formulas stored in a storage part 33 are associated.

DESCRIPTION OF THE EMBODIMENTS

Figure 1:
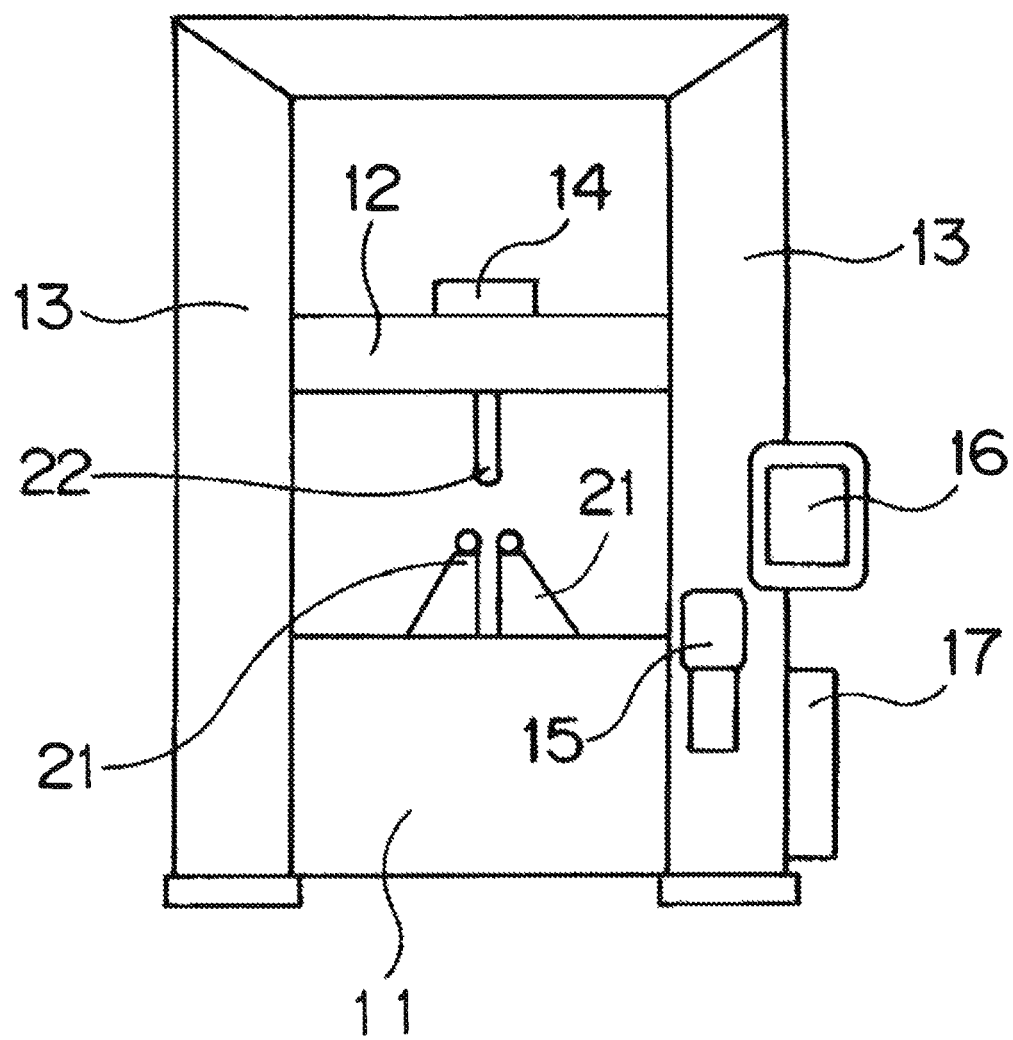
FIG. 1 is a schematic front view of a material testing machine according to the disclosure.

The disclosure is made to solve problems above, and aims to provide a material testing machine which can more easily perform inputs of numerical values.

The disclosure recited in technical solution 2 is the material testing machine according to technical solution 1, wherein the test information includes a type of a test, a shape of a test piece, and setting items corresponding to the type of the test.

The disclosure recited in technical solution 3 is the material testing machine according to technical solution 1 or 2, wherein the first input interface is a setting screen in which settings at the time of displaying a test result by a graph are performed, and the display control part makes the second input interface be displayed in the display device when there are inputs for changing a display range of the graph in the first input interface.

According to the disclosure recited in technical solutions 1-3, the calculation formulas for working out the material characteristic values from the measurement data are stored in the storage part, so that the parameters included in the calculation formulas selected from the test information can be automatically calculated. In addition, the display control part displays the first input interface in which the numerical value display column is provided and the second input interface in the display device, wherein the second input interface is provided with: the input column; the number keys which accept the input operations of the numerical values input into the input column; the operation keys which correspond to the four arithmetic operations; the parameter buttons which are associated with the parameters included in the calculation formulas selected from the test information, wherein the calculation formulas are among the calculation formulas stored in the storage part and used for working out the material characteristic values from the measurement data; and the confirmation button which reflects the numerical values of the input column in the numerical value display columns in the first input interface. The result, which is obtained by the operation part operating the parameters included in the calculation formulas based on the test information, is associated with the parameter buttons and stored in the storage part, and when the instruction for inputting the numerical values in the numerical value display columns is received from the first input interface, the second input interface provided with the parameter buttons is displayed in the display device. Therefore, the user can read out the parameters particular to each test from the storage part only by touching the parameter buttons, and can input the particular parameters to the input column of the second input interface by one-touch. Because the operation keys are also provided in the second input interface, it is not necessary for the user to use the calculators separately to calculate the material characteristic values, and can obtain the material characteristic values using an operation function of the material testing machine by simple numerical value input. Besides, the material characteristic values obtained by calculations can be reflected in the numerical value display columns in the first input interface by the confirmation button provided in the second input interface, and the user can easily change the numerical values in the numerical value display columns.

According to the disclosure recited in technical solution 3, the range of the graph display of the test result on the display device can be set using particular parameters in each test which are associated with the parameter buttons and stored, so that the user can easily calculate a maximum value and a minimum value of material characteristic values, which are expected by a test setting, by using the parameter buttons, and can easily optimize the graph display.

Figure 2:
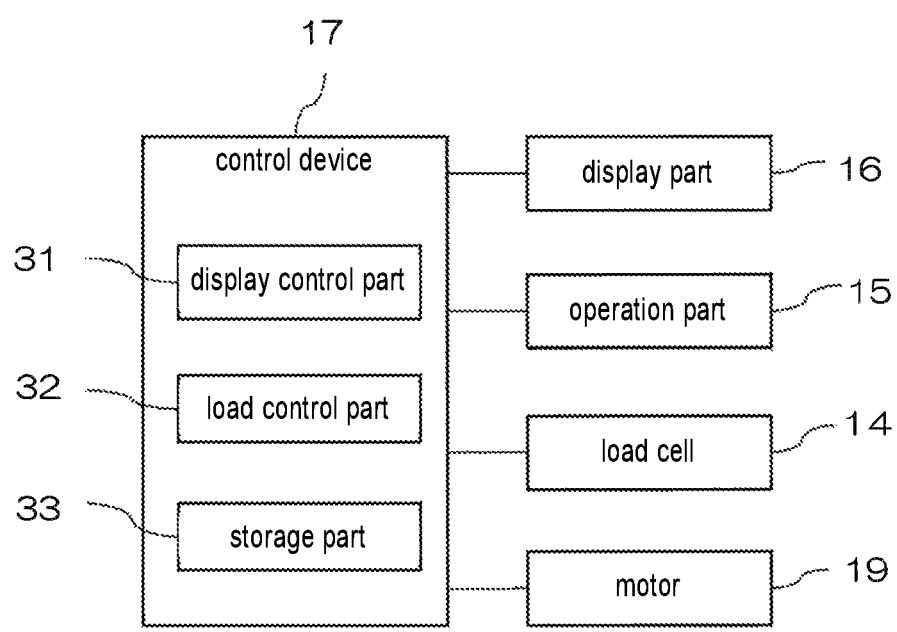
FIG. 2 is a block diagram describing a main control system of a material testing machine of the disclosure.

Next, embodiments of the disclosure are described based on drawings. FIG. 1 is a schematic front view of a material testing machine according to the disclosure. FIG. 2 is a block diagram describing a main control system of the material testing machine of the disclosure.

The material testing machine disposes a test piece in a test space of a material testing machine body, which is enclosed by a cross-head 12, a base 11, and covers 13 erected on the right and left of the base 11, to conduct a three-point bending test as a material test. The test piece is disposed in the test space by being supported by a pair of support members 21 which are disposed on the base 11.

On both end portions of the cross-head 12, nut portions are disposed which are not shown in the drawings and screwed with a pair of screw rods provided inside the covers 13 that are erected on the right and left of the base 11. Besides, the pair of screw rods rotate synchronously due to the drive of a motor 19 (see FIG. 2) that is disposed inside the base 11, thereby moving the cross-head 12 in a vertical direction. An indenter 22 is disposed on the cross-head 12. A test force is loaded to the test piece by descending the cross-head 12 and pressing, by the indenter 22, the test piece supported by the support members 21.

The test force loaded to the test piece is detected by a load cell 14 disposed on the cross-head 12 and serving as a force detector. Signals from the load cell 14 are input to a control device 17. Based on the signals from the load cell 14, the control device 17 creates drive control signals of the motor 19 for ascending/descending the cross-head 12. Accordingly, a rotation of the motor 19 is controlled and the cross-head 12 moves along a load axis, and various material tests such as a bending test and so on are conducted.

The control device 17 is connected to a display part 16 and a handling part 15 that is used when a start or a stop of the test and ascending/descending operations of the cross-head 12 and so on are performed. Besides, the control device 17 is configured by a computer or a sequencer which includes an operation device, and peripheral circuits of them. The computer or the sequencer inside the control device 17 and their peripheral circuits are provided to realize individual function of the following parts, that is, a load control part 32 that controls a load mechanism of the testing machine body by controlling the drive of the motor 19 that makes the pair of screw rods rotate synchronously, a display control part 31 that controls a screen display to the display part 16 described later; and a storage part 33 that stores parameter values registered on function buttons on a screen displayed on the display part 16, or operation programs of the testing machine body. The display part 16 is a liquid crystal display device including a touch panel, and functions as an input device and a display device.

Figure 4A:
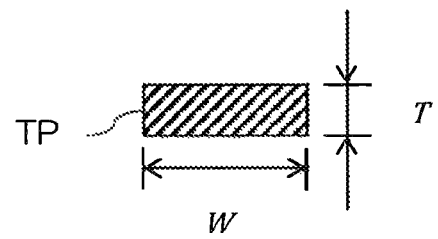
FIGS. 4A to 4C are diagrams describing test piece shapes and variables in calculation formulas in the table in FIG. 3.
Figure 4B:
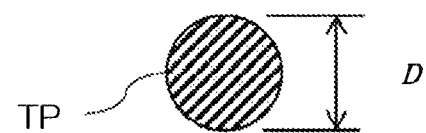
Figure 4C:
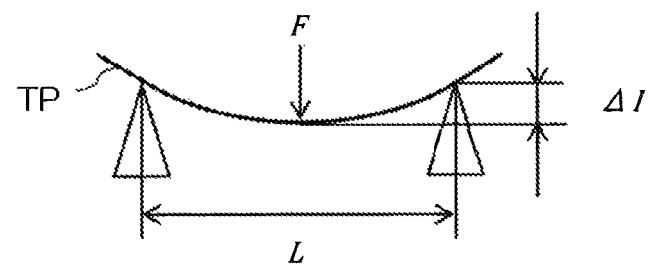
Figure 5:
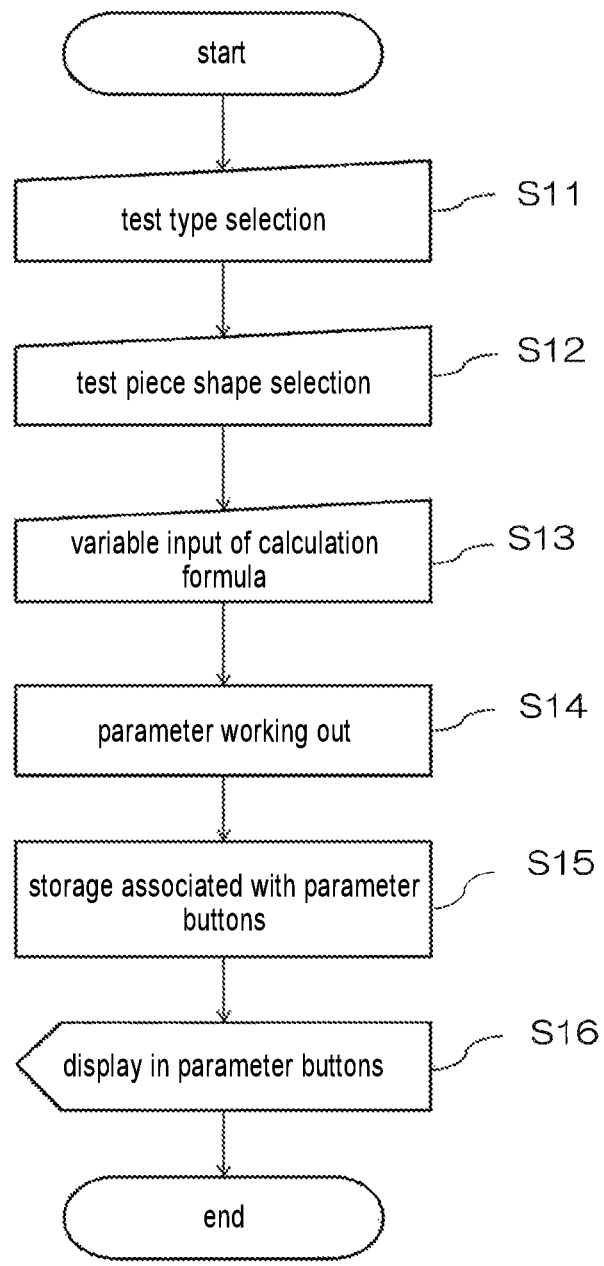
FIG. 5 is a flowchart describing registrations of parameters to screen buttons.

FIG. 3 is a table in which test piece shapes and calculation formulas stored in a storage part 33 are associated. FIGS. 4A to 4C are diagrams describing test piece shapes and variables in the calculation formulas in the table in FIG. 3. FIG. 5 is a flowchart describing registrations of parameters to screen buttons.

The storage part 33 stores test contents that can be conducted by the material testing machine, test categories such as a tensile test, a compression test, a bending test and so on, and test piece information such as shapes of test pieces which are defined by standards. In the material testing machine, calculation formulas of the test-particular parameters and the calculation formulas of material characteristic values worked out using the calculation formulas of the test-particular parameters are associated with the test categories and the test piece information and stored in the storage part 33. For example, as shown in the table of FIG. 3, for the application in a three-point bending test, calculation formulas of a cross-sectional secondary moment I, a cross section modulus Z, a bending moment M, a stress G, and a strain c are associated with the shapes (flat plate, round bar) of the test pieces TP and stored in advance.

When a user selects the three-point bending test in test types (step S11), and selects a flat plate shape in the selection of test piece shapes (step S12), in a variable input (step S13), the user inputs values of a width W, a thickness T (see FIG. 4A), and a distance between fulcrums L (see FIG. 4C) (step S13). In this case, according to the calculation formulas shown in FIG. 3, the cross-sectional secondary moment I and the cross section modulus Z, which are parameters particular to the three-point bending test, are automatically calculated (step S14). In addition, when a round bar shape is selected as the shape of the test piece TP, the user inputs values of a diameter D (see FIG. 4B), and the distance between fulcrums L (see FIG. 4C), by which the cross-sectional secondary moment I and the cross section modulus Z are automatically calculated according to the calculation formulas shown in FIG. 3. The calculated cross-sectional secondary moment I and cross section modulus Z are respectively associated with specific parameter buttons 57 (see FIG. 7 described later) that are assigned and stored in the storage part 33 (step S15). Furthermore, the test piece information can also be input by selecting the number (for example, test piece No. JIS1) of the test piece defined by a standard instead of inputting the selection of the test piece shape and numbers such as the width W and the thickness T.

Figure 6:
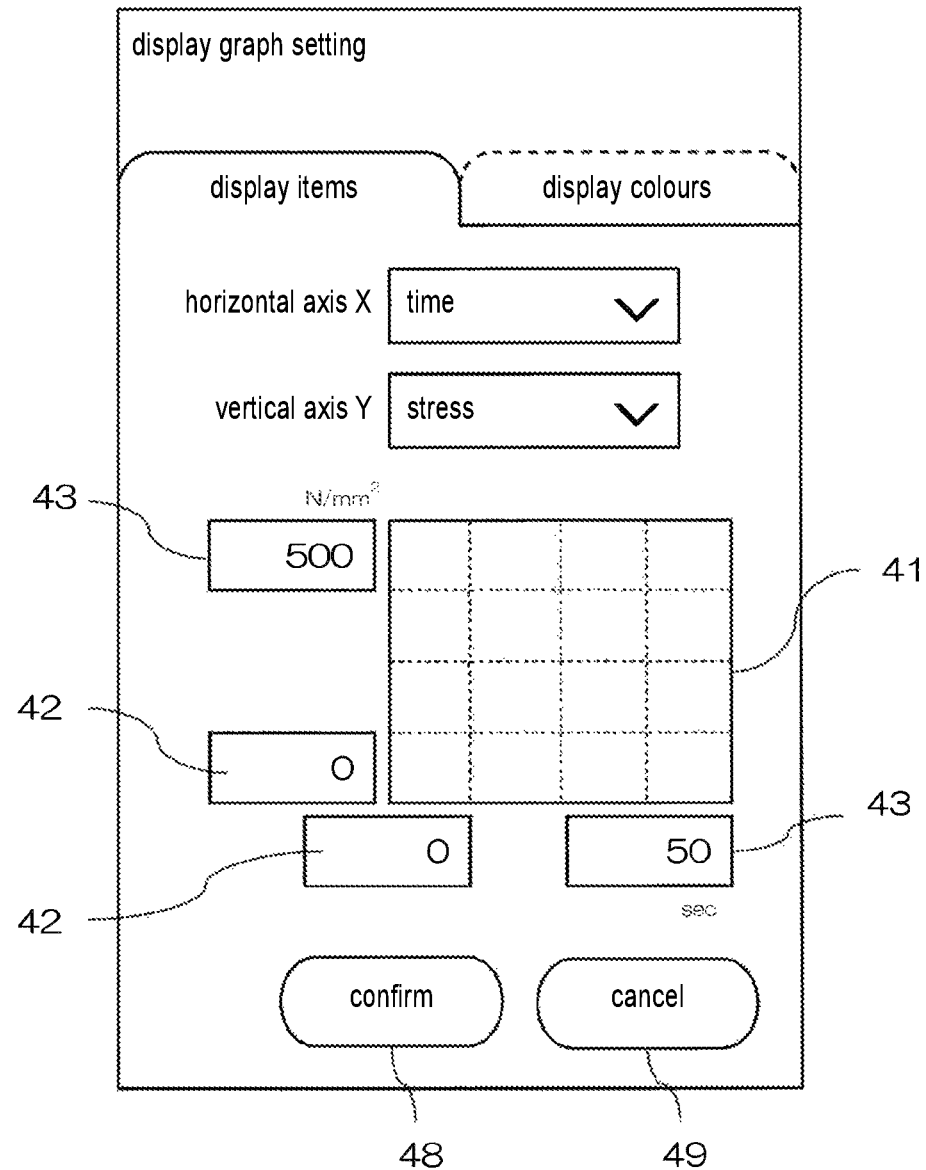
FIG. 6 is a schematic diagram describing a screen displayed in a display part 16.
Figure 7:
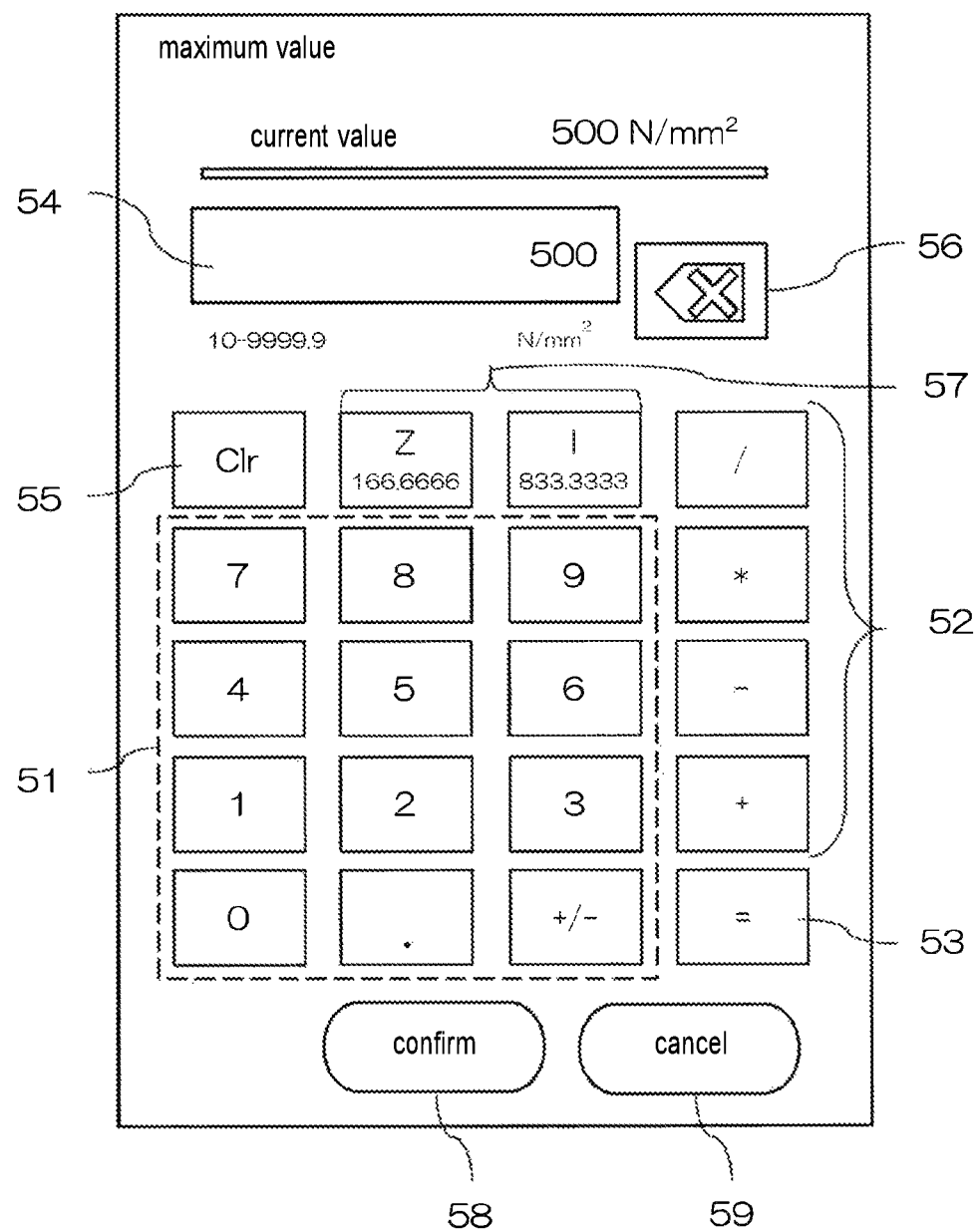
FIG. 7 is a schematic diagram describing a screen displayed in a display part 16.

FIG. 6 and FIG. 7 are schematic diagrams describing the screens displayed in the display part 16. FIG. 6 is a display example of a display graph set screen for setting a graph display which displays the stress over time, and FIG. 7 is a display example of a screen for numerical value input in which operation elements such as number keys and so on for inputting numerical values to a numerical value display column provided in FIG. 6 are arranged.

As the screen displayed in the display part 16 of the material testing machine, various setting screens are prepared in which the operation elements required for each setting such as a setting of testing condition or a display setting of a test result and so on are provided to receive inputs of the user. A setting screen, in which these layouts are defined, has a structure for providing a tab for each setting item in the same window to switch display contents, or a hierarchical structure such as a display of a modal window linked with a parent window and so on, and is stored in the storage part 33. In FIG. 6, a setting screen of the graph display, which is one of the setting screens read out from the storage part 33 by an action of the display control part 31, is shown. The screen shown in FIG. 6 is a first input interface of the disclosure.

In the display graph setting, a graph display region 41 is arranged, and the tab of "display items" for setting items of a horizontal axis X and a vertical axis Y of the graph or a maximum value/a minimum value of each axis, and the tab of "display colours" for setting colours of a background or lines of the graph display region 41 and so on are prepared to be capable of being switched and displayed in the same window. In the "display items", items of the horizontal axis X and the vertical axis Y of the graph can be selected in a pull-down menu format. In the display example of FIG. 6, time is selected for the horizontal axis X, and stress is selected for the vertical axis Y. In addition, in the display example of FIG. 6, numerical value display columns 42 that display the minimum values of the horizontal axis X and the vertical axis Y of the graph and numerical value display columns 43 that display the maximum values are respectively arranged for each axis. Furthermore, a confirmation button 48 that reflects the display setting changed by the display graph setting and a cancellation button 49 that closes the display graph setting screen are arranged.

The screen for numerical value input shown in FIG. 7 is a second input interface, which is displayed in the display part 16 when the user touches the numerical value display columns 42, 43 of the first input interface, and gives an instruction of inputting a numerical value to any one of the numerical value display columns 42, 43. In the embodiment, the screen of FIG. 6 is defined as a primary window of a GUI screen, the screen shown in FIG. 7 is defined as a secondary window, and when the user touches the numerical value display column 43 for inputting the maximum value of the vertical axis Y of the graph by the primary window, the secondary window is superimposed with the primary window or in parallel horizontally or vertically to conduct a display control displayed in the display part 16.

The screen for numerical value input shown in FIG. 7 is provided with numerical value input keys 51 that are composed of a decimal point key, number keys of 0-9 and a symbol changing key for changing symbols of plus or minus of input numerical values, operation keys 52 that are assigned to four arithmetic operations, an equal key 53 for obtaining a calculation result, an input column 54 in which the values input by using numerical value input keys 51 and so on are displayed, a clear key 55 for deleting the numerical values or operations input previously and emptying the input column 54, a backspace key 56 for deleting the numerical values in the input column 54 character by character, a confirmation button 58 for reflecting the numerical values of the input column 54 in the numerical value display columns 42, 43 of the graph display of the FIG. 6, and a cancellation button 59 for closing the screen for numerical value input. Besides, the screen for numerical value input is provided with the parameter buttons 57 that are assigned to the parameters stored in the storage part 33.

The numerical values of the parameters, which are stored in the storage part 33 after the automatic calculation receiving the input of the test piece information and so on by the user, are used for a real-time calculation for displaying the graph, which shows changes over time of the stress G and so on in a test, in the display part 16. In addition, the numerical values of the parameters are associated with each parameter button 57 provided in the screen for numerical value input shown in FIG. 7 and are stored in the storage part 33 (step S15). When the user selects any one of the numerical value display columns 42, 43 and gives an input instruction at the time of changing the display range of the vertical axis Y and the horizontal axis X of the graph in the display graph setting shown in FIG. 6, the screen for numerical value input shown in FIG. 7 is displayed in the display part 16.

As shown in FIG. 7, in frameworks of the parameter buttons 57, numerical values that are calculation results in step S14 are displayed along with symbols I, Z and the like of the parameters that are registered in the parameter buttons 57 (step S16). In this way, the parameter buttons 57 which are assigned to the parameters are provided on the screen for numerical value input, and the parameters automatically calculated are registered in the parameter buttons 57; accordingly, by selecting the parameter buttons 57 on the screen of the display part 16, the user can input the numerical values of the parameters to the input column 54 by one-touch.

Furthermore, in the above-described embodiment, the display of the parameters when the bending test is performed is described; however, on an occasion of a tensile test, the calculation formulas of the cross-sectional area, the stress G, the strain E of the test piece TP are also associated with the shape of the test piece TP (flat plate, round bar) and stored in the storage part 33 in advance. Therefore, when the user selects tensile test as the test category in step S11 shown in FIG. 5 and selects round bar shape as the shape of the test piece TP in step S12, the cross-sectional area of the test piece TP, which is a particular parameter of the tensile test, is automatically calculated in step S14 by the user inputting a diameter of the test piece TP and a distance between gauge points in step S13. Besides, the cross-sectional area is registered in the parameter buttons 57.

What is claimed is:

1. A material testing machine, which comprises a graphical user interface comprising a display device and an input device, the material testing machine comprising a control device that has:
   a display control part configured to control a screen display to the display device;
   a storage part configured to associate calculation formulas for working out material characteristic values from measurement data with test information and store the calculation formulas; and
   an operation part configured to work out the material characteristic values using the calculation formulas read out from the storage part;
   wherein the display control part displays a first input interface, in which numerical value display columns are provided, in the display device, and displays a second input interface in the display device when an instruction for inputting numerical values to the numerical value display columns is received from the first input interface, wherein the second input interface is provided with an input column, number keys which accept input operations of the numerical values input into the input column, operation keys which correspond to four arithmetic operations, parameter buttons which are associated with parameters comprised in calculation formulas corresponding to a test selected by a user, and a confirmation button which reflects the numerical values of the input column in the numerical value display columns in the first input interface;
   the operation part calculates, based on the test information, the parameters comprised in the calculation formulas corresponding to the test selected by the user; and
   wherein the storage part associates the calculated parameters which have been calculated by the operation part with the parameter buttons, and stores the calculated parameters,
   wherein the display control part is configured to control the display device to display the calculated parameters which have been calculated by the operation part on the parameter buttons.

2. The material testing machine according to claim 1, wherein
   the test information comprises a type of a test, a shape of a test piece, and setting items corresponding to the type of the test.

3. The material testing machine according to claim 1, wherein
   the first input interface is a setting screen in which settings at a time of displaying a test result by a graph are performed, and
   the display control part makes the second input interface be displayed in the display device when there are inputs for changing a display range of the graph in the first input interface.

4. The material testing machine according to claim 2, wherein
   the first input interface is a setting screen in which settings at a time of displaying a test result by a graph are performed, and
   the display control part makes the second input interface be displayed in the display device when there are inputs for changing a display range of the graph in the first input interface.

5. The material testing machine according to claim 1, wherein each parameter button is configured to, when selected, cause a respective calculated parameter displayed on the parameter button, to be inputted to the input column by one touch.

* * * * *